United States Patent [19]

Herstad et al.

[11] Patent Number: 4,796,546
[45] Date of Patent: Jan. 10, 1989

[54] COMBUSTION PLANT INCLUDING A CIRCULATION FLUID BED

[75] Inventors: Ola Herstad, Torslanda; Lars Olausson, Angered, both of Sweden

[73] Assignee: Gotaverken Energy Systems AB, Gothenburg, Sweden

[21] Appl. No.: 79,924

[22] Filed: Jul. 31, 1987

[30] Foreign Application Priority Data

Aug. 14, 1986 [SE] Sweden ............................... 8603419

[51] Int. Cl.$^4$ .......................... F23J 3/00; B01D 45/04
[52] U.S. Cl. ..................................... 110/216; 110/245; 110/263; 431/170; 122/480; 165/103; 165/104.18; 55/278; 55/434
[58] Field of Search ...................... 431/7, 170; 122/40, 122/235 L, DIG. 3, 480, 479 D; 55/278, 434; 422/146, 147; 165/920, 103, 104.18; 110/216, 245, 263

[56] References Cited

U.S. PATENT DOCUMENTS

| Re. 21,257 | 11/1939 | Lucke | 122/480 |
|---|---|---|---|
| 1,728,877 | 9/1929 | Mumford | 55/278 X |
| 3,522,841 | 8/1970 | Papalexiou | 165/103 |
| 3,823,693 | 7/1974 | Bryers et al. | 122/40 |
| 4,312,301 | 1/1982 | Anson | 122/410 |
| 4,454,838 | 6/1984 | Strohmeyer, Jr. | 431/170 X |
| 4,552,203 | 11/1985 | Chrysostome et al. | 422/147 X |

FOREIGN PATENT DOCUMENTS

| 0093063 | 2/1983 | European Pat. Off. . | |
|---|---|---|---|
| 324443 | 6/1918 | Fed. Rep. of Germany . | |
| 341456 | 10/1921 | Fed. Rep. of Germany . | |
| 745679 | 12/1943 | Fed. Rep. of Germany | 55/278 |
| 99783 | 3/1938 | Sweden . | |
| 342439 | 2/1931 | United Kingdom | 55/278 |
| 2046886 | 11/1980 | United Kingdom | 431/170 |

Primary Examiner—Larry Jones
Assistant Examiner—Carl D. Price
Attorney, Agent, or Firm—Wegner & Bretschneider

[57] ABSTRACT

A combustion plant includes a circulating fluid bed, which is maintained by the supply of fuel, inert material and oxygen-containing fluidizing gas to a vertical furnace shaft. This is, at its upper end provided with an outlet for combustion gases and bed materials, which is separated from gas in a separating means, and by way of a lock is returned to the furnace shaft. The separating means is of a mechanical type, and located vertically above a further vertical shaft communicating with the lock. The further shaft encloses distribution means for the particles and a heat exchanger for cooling the particles falling from the gas stream, before they are re-introduced into the furnace shaft by way of the lock.

6 Claims, 2 Drawing Sheets

COMBUSTION PLANT INCLUDING A CIRCULATION FLUID BED

BACKGROUND OF THE INVENTION

The present invention refers to a combustion plant including a circulating fluid bed, which is maintained by the supply of fuel, inert, fine-ground material and oxygen-containing fluidization gas to a vertical furnace shaft, the upper part of which has an outlet to a separator means, where solid particles are separated from the combustion gases and are returned to the lower end of the furnace shaft by way of a lock.

In a combustion plant of above-mentioned type a cyclone separator will form an important part of the cost, and will also require much space. In a big CFB-boiler a single cyclone will often be inefficient due to its size. A plant with an output of 125 MW is thus preferably provided with two cyclones, which may have a diameter of 5 meters and a height of 17 meters. The total space requirement for these cyclones will be about 2.400 m$^3$. The consumption of electricity for the cyclones will be about 120 kW, and the cost for the units may amount to 9-10 millions SEK. A similar plant for 250 MW would require twice the number of cyclones, and would mean a corresponding increase in space and costs.

In order to maintain the temperature in the furnace at a desired level, it is advantageous to cool the separated particles before they are reintroduced into the furnace.

Big cyclone separators will limit the space for mounting coolers for the bed particles in the shaft between the separators and the lock for re-introducing the bed material into the furnace. Especially when burning coal it will often be necessary to fit extra heat exchange surfaces, for instance superheaters, in the furnace, if this is not extremely high to ensure sufficient heat surfaces. An alternative is to withdraw bed material downstream of the cyclones for cooling in an external heat exchanger, before re-introduction into the furnace. Both superheater and external heat exchanger will cause considerably increased costs.

An aim of the present invention is to propose a cheaper solution of the problems pertaining to the separation of particles from combustion gases, which requires less space than before and makes possible the mounting of adequate cooling surfaces.

SUMMARY OF THE INVENTION

The solution according to the invention lies in the separator means including a number of mechanical contact members located in the upper part of a vertical collecting shaft leading to the lock, the shaft enclosing a distribution means and a heat exchanger for cooling the falling particles separated from the gas flow before the collection in the lock.

The separator means preferably includes a number of plates arranged adjacent to the outlet and in parallel relationship mutually and to the gas flow, the plates being inclined sidewardly towards the collecting shaft, as viewed in the direction of flow, for separating particles from the laminar gas flow, the particles sliding along the plates towards the collecting shaft. Each plate is advantageous provided with an upwardly turned separation ledge at its downstream edge for catching very fine, slowly descending particles.

According to a preferred embodiment of the invention a number of plates in a vertical stack are formed into a removable cassette.

The particle cooler preferably comprises horizontal tubes extending transversally with respect to the collecting shaft, the tubes being so distributed therein that at least one, upwardly diverging passage is formed for the dribble of particles from the separator means.

The distribution means is preferably adjustable with respect to the number of tubes subjected to the downwards flow of particles, in order to by-pass all, or part of the flow for adjusting the cooling of the circulating bed material in relation to occasional operating conditions. The distributing means may include at least one perforated plate pivotable about a horizontal axis.

DESCRIPTION OF A PREFERRED EMBODIMENT

Figure 1:
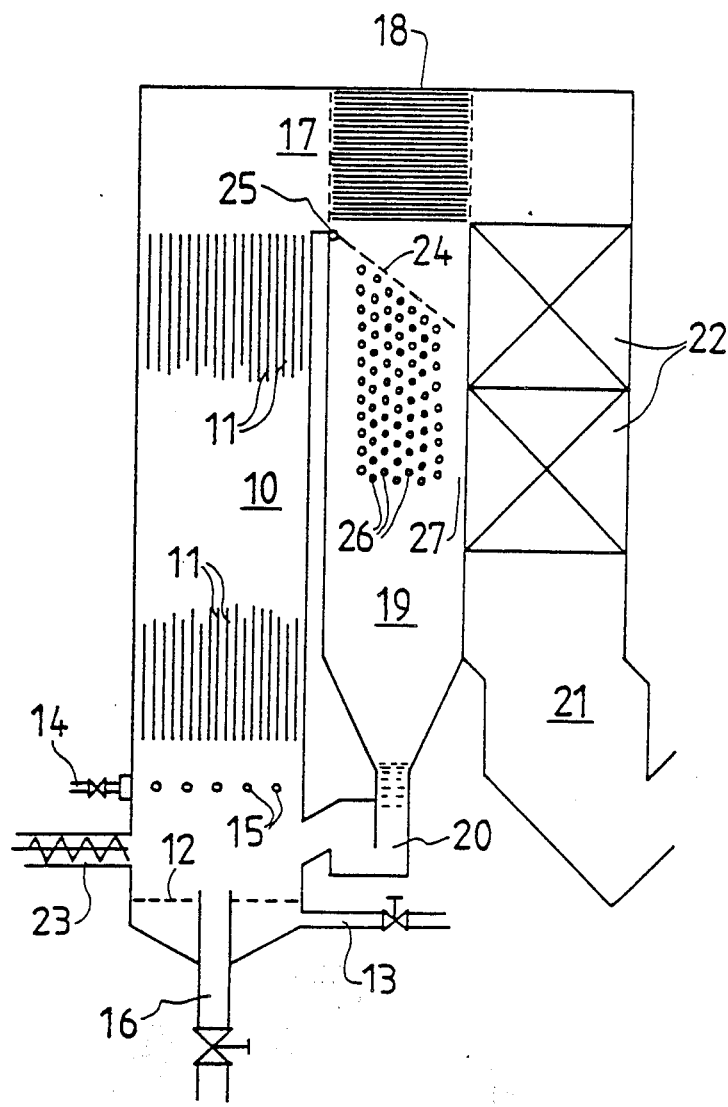
FIG. 1 shows the basic outlay of a combustion plant according to the invention.

As is schematically shown in FIG. 1 a combustion plant according to the invention includes a furnace shaft 10 having vertical wall tubes 11, and a distribution grid 12 for fluidizing gas supplied through a conduit 13 at its lower end. Secondary gas is supplied to the furnace through a conduit, 14 communicating with a number of openings 15 in the furnace wall. Ash and other combustion residues may be withdrawn through a conduit 16, having a closure valve. The upper art of the furnace has an outlet 17 for gases and bed material. At the outlet 17 there is a separating means 18 of the mechanical type.

A further vertical shaft 19 is provided downstream of separating means 18, in which particles may fall downwards to a lock 20, which communicates with the lower end of the furnace. The combustion gases, passing horizontally through the separating means, will be conducted away through a still further shaft 21 enclosing heat exchangers 22.

The furnace 10 is operated in a manner conventional for CFB plants, fuel, for instance finely ground coal and inert bed material, for instance sand and limestone, are supplied through a screw conveyor 23. The fluidizing gas supplied through conduct 13 will lift the bed material, so heavier particles will circulate in the lower portion of the furnace, and successively lighter particles will be lifted higher up in the shaft, the lightest particles (dust) passing out through the outlet 17.

The fluidizing and the secondary gas are preferably air, heated in a conventional manner. The secondary gas ensures complete combustion. The relationship between the two gas flows, and the speeds thereof will maintain a desired particle density within the furnace shaft.

During the passage through the separating means 18 a separation of particles from the combustion gas occurs, the particles falling down upon a distribution means 24, at least part of which is pivotable about a horizontal axis 25, adjacent to one of the walls defining the collection shaft. By adjusting the position of the distribution means 24 parts of the stream of particles may be led past heat exchange surfaces formed by cooling fluid conveying tubes 26, extending transversely through the further shaft 19 downstream of the distribution means 24. The tubes 26 will leave one or more passages 27 free for by-passing all or part of the particle flow.

The distribution means may include at least one plate which conveniently is perforated, and the occasional inclination of the plate will determine the amount of particles passing through the perforations, or the amount sliding off the plate into passage 27, respectively.

Figure 2:
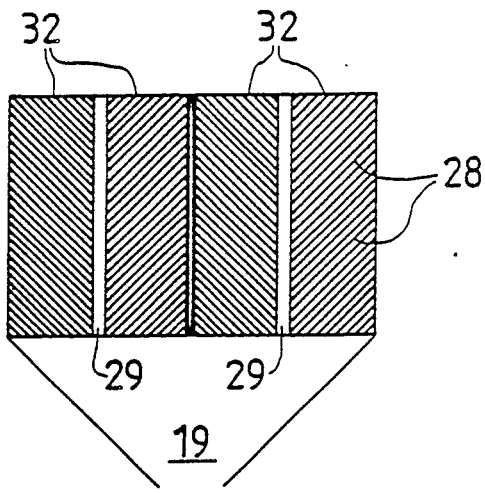
FIG. 2 on a larger scale shows in cross-section in the direction of flow the separator means forming part of the invention.
Figure 3:
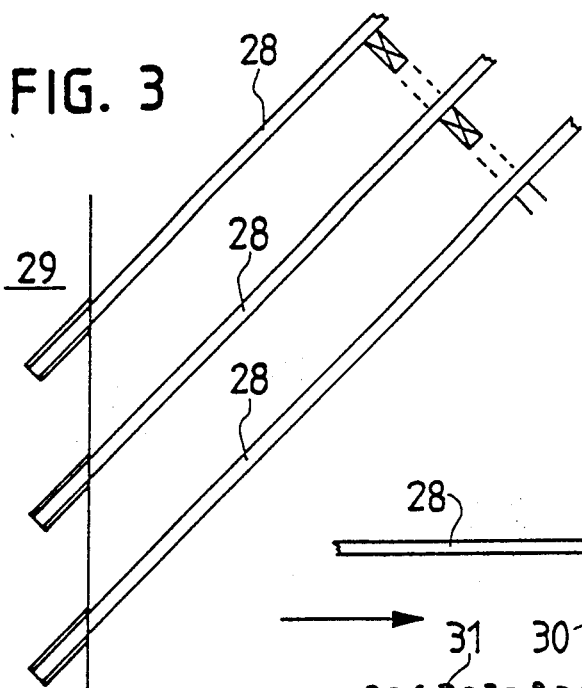
FIG. 3 shows an enlargement of a detail in the separating means, as viewed in the direction of flow of the gases.
Figure 4:
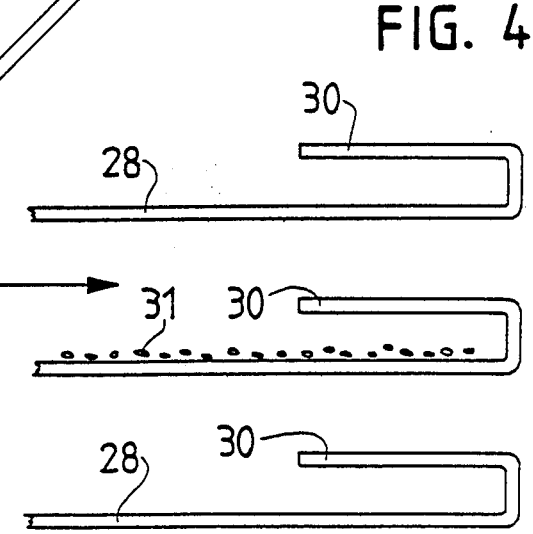
FIG. 4 shows a detail of the separating means, viewed transversely with respect to the gas flow.

FIG. 2 shows an embodiment of the separating means 18, as seen in the direction of gas flow. The separator includes a number of plates 28, which are mutually parallel and also parallel to the gas flow. The plates are inclined about 45° as seen in the direction of flow, towards collecting passages 29, open to the further shaft 19. FIG. 4 shows how each plate 28 at its downstream edge is provided with an up-turned separating ledge 30.

During the passage of the gas between two plates, particles 31 will sink downwards due to the influence of gravity, and drop onto the lower plate 28. The particles 31 will then slide along this plate, out into the adjacent collecting passage 29, communicating with the further shaft 19, in which the particles will "drip" down onto the distributing plate 24. Depending upon the occasional adjusting position of the plate, a pre-determined amount of hot particles, will be sprinkled over the cooling surfaces formed by the tubes 26.

The separating ledges 30 are intended to catch slowly sinking fine particles. When caught these particles will also slide down into the collecting passages 29.

Due to the arrangement of separating means and cooler described above, several advantages are obtained, such as a high degree of separation due to laminar flow without any disturbing change of flow direction. The pressure drop across the separator is low, as the combustion gases will pass linearly, which also results in low erosion. The cost for a separator of this design is about 50% of that for a conventional cyclone separator with the same capacity. The low building height permits the use of an efficient, integrated particle cooler having a controlable output. The tubes may easily be provided with surface enlarging elements. No risk for sintering of the passing bed material will occur. Due to the governing of the particle flow by means of the distribution plate the erosion of the cooling tubes may be reduced.

The plates 28 of the separating means 18 are mounted in cassettes 32, which are easily removed for overhaul.

The invention is not limited to the embodiment shown and described, as many modifications are possible within the scope of the appended claims. The plate separating means 18 may be augmented or substituted by other types of mechanical separators. The adjustment of the distribution plate in the collecting shaft 19 may be modified by the inclusion of butterfly valves or axially displaceable members. Instead of a tube heat exchanger, any conventional plate type heat exchanger may be used.

We claim:

1. A combustion plant comprising a combustion shaft having a vertical axis with a lower end and an upper end as well as means for supplying fuel and inert material to form a particulate bed, first and second vertical shafts parallel to said combustion shaft, a horizontal passage connecting the upper ends of said shafts, a lock communicating the lower end of said first shaft with said combustion shaft, means to convey combustion gases away from said second shaft, means for supplying a fluidizing gas to the lower end of said combustion shaft for burning said fuel while causing fluid circulation up through said combustion shaft and down through said first shaft, a mechanical separator means in said horizontal passage, above said first shaft and including a plurality of mutually parallel plates being inclined in relation to the vertical axis of said first shaft and arranged to ensure a laminar gas flow from said combustion shaft to said second shaft while separating out entrained particles for a free drop down said first shaft, a heat exchanger comprising heat exchange surfaces traversing said first shaft, and being so distributed therein that at least one free vertical passage is formed for descending particles, below said separator means, and a particle distribution device located below said separator means for directing said dropping particles in preselected proportions towards said heat exchanger and said passage, respectively.

2. A combustion plant according to claim 1 in which each of said mutually parallel plates has an upwardly turned separation ledge at its downstream edge.

3. A combustion plant according to claim 1 in which said mutually parallel plates are formed into a removable cassette.

4. A combustion plant according to claim 1 in which said distribution means includes at least one adjustable plate permitting an optional by-passing of particles past at least part of said heat exchanger.

5. A combustion plant according to claim 1 in which said distribution means includes at least one perforated plate pivotable about a horizontal axis.

6. A combustion plant according to claim 1 in which said first vertical shaft is defined by first and second walls located opposite to each other, said at least one free vertical passage is located adjacent to said first wall, and said particle distribution device comprises a perforated plate hinged adjacent to said second wall, which, extending in swung-down position, directs a majority of said particles toward said at least one free vertical passage.

* * * * *